(12) United States Patent
Bayer

(10) Patent No.: US 9,500,306 B2
(45) Date of Patent: Nov. 22, 2016

(54) MULTIPLE SECURED COUPLING DEVICE FOR OXYGEN LANCES

(75) Inventor: Reinhardt Bayer, Duisburg (DE)

(73) Assignee: BEDA Oxygentechnik Armaturen GmbH, Ratingen (DE)

(*) Notice: Subject to any disclaimer, the term of this patent is extended or adjusted under 35 U.S.C. 154(b) by 49 days.

(21) Appl. No.: 13/977,085

(22) PCT Filed: Dec. 15, 2011

(86) PCT No.: PCT/DE2011/002127
§ 371 (c)(1),
(2), (4) Date: Jun. 28, 2013

(87) PCT Pub. No.: WO2012/089188
PCT Pub. Date: Jul. 5, 2012

(65) Prior Publication Data
US 2013/0285373 A1    Oct. 31, 2013

(30) Foreign Application Priority Data

Dec. 28, 2010 (DE) .......... 10 2010 056 153
Mar. 18, 2011 (DE) .......... 10 2011 014 323

(51) Int. Cl.
*F16L 17/00* (2006.01)
*F16L 19/02* (2006.01)
*C21C 5/46* (2006.01)

(52) U.S. Cl.
CPC .......... *F16L 19/02* (2013.01); *C21C 5/462* (2013.01)

(58) Field of Classification Search
USPC ................................ 285/3, 351, 354
See application file for complete search history.

(56) References Cited

U.S. PATENT DOCUMENTS

| | | | | |
|---|---|---|---|---|
| 2,829,673 | A | * | 4/1958 | Reese ............................ 138/44 |
| 3,201,148 | A | * | 8/1965 | Shurtleff ........................ 285/3 |
| 3,202,442 | A | * | 8/1965 | Abbey et al. .................. 285/3 |
| 3,476,414 | A | * | 11/1969 | Condrac ...................... 285/349 |
| 3,533,649 | A | * | 10/1970 | Williams ................. 285/148.13 |
| 3,900,223 | A | * | 8/1975 | Schafer et al. .................. 285/4 |
| 4,278,276 | A | * | 7/1981 | Ekman ........................... 285/49 |
| 4,555,129 | A | * | 11/1985 | Davlin ................. F16L 25/023 285/136.1 |
| 4,750,765 | A | * | 6/1988 | Cassidy et al. ............... 285/321 |
| 4,801,160 | A | * | 1/1989 | Barrington .......... F16L 19/0218 285/110 |

(Continued)

FOREIGN PATENT DOCUMENTS

| | | |
|---|---|---|
| DE | 102008012554 A1 | 9/2009 |
| DE | 102009005940 B3 | 7/2010 |

(Continued)

*Primary Examiner* — Aaron Dunwoody
(74) *Attorney, Agent, or Firm* — James Creighton Wray; Meera P. Narasimhan

(57) ABSTRACT

In a multiple secured coupling device for oxygen lances (1), the male connector (8) of the safety pipe (3), the connection part (18) of the lance holder (2) and also the cap nut (9) have extending safety pieces (10, 11). The male connector (8) can be inserted very far into the female part (19) or the connection part (18) and then located in position by using the cap nut (9). A total of five sealing zones are created and are particularly effective in preventing the escape of highly flammable gases, in particular oxygen.

26 Claims, 3 Drawing Sheets

(56) References Cited

U.S. PATENT DOCUMENTS

| | | | | |
|---|---|---|---|---|
| 5,110,160 | A * | 5/1992 | Brozovic | F16L 15/008 |
| | | | | 285/211 |
| 5,678,607 | A * | 10/1997 | Krywitsky | F16L 15/001 |
| | | | | 138/89 |
| 6,460,900 | B1 * | 10/2002 | Bakke | 285/330 |
| 6,481,761 | B2 * | 11/2002 | Schroeder | F16L 19/0218 |
| | | | | 285/328 |
| 7,032,677 | B2 * | 4/2006 | McGuire | E21B 33/068 |
| | | | | 166/379 |
| 7,077,436 | B1 * | 7/2006 | Krywitsky | F16L 15/08 |
| | | | | 285/354 |
| 7,350,831 | B2 * | 4/2008 | Shimizu | 285/334.5 |
| 7,475,721 | B2 * | 1/2009 | McGuire | E21B 33/03 |
| | | | | 166/75.13 |
| 7,690,693 | B2 * | 4/2010 | Moner | F16L 25/009 |
| | | | | 285/247 |

FOREIGN PATENT DOCUMENTS

| | | |
|---|---|---|
| EP | 0456377 A2 | 11/1991 |
| JP | 58132335 U | 9/1983 |
| JP | 01159513 A | 6/1989 |

* cited by examiner

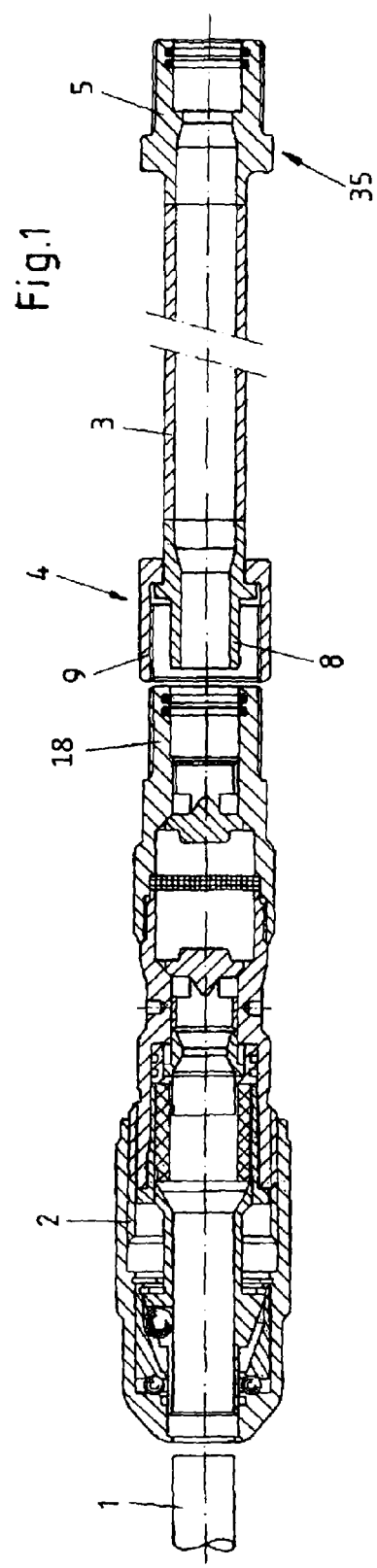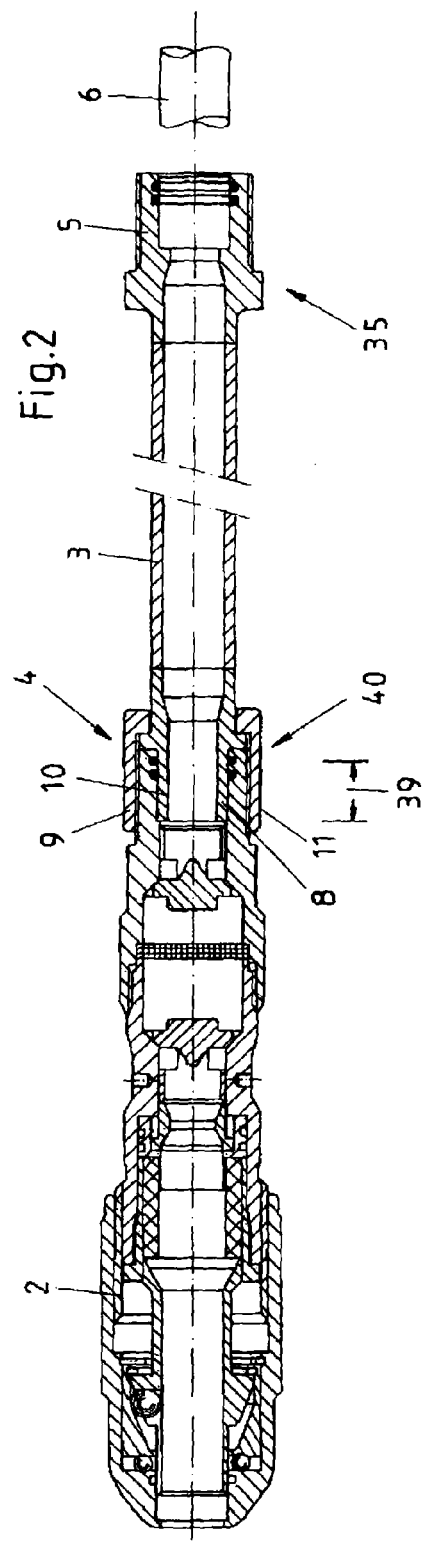

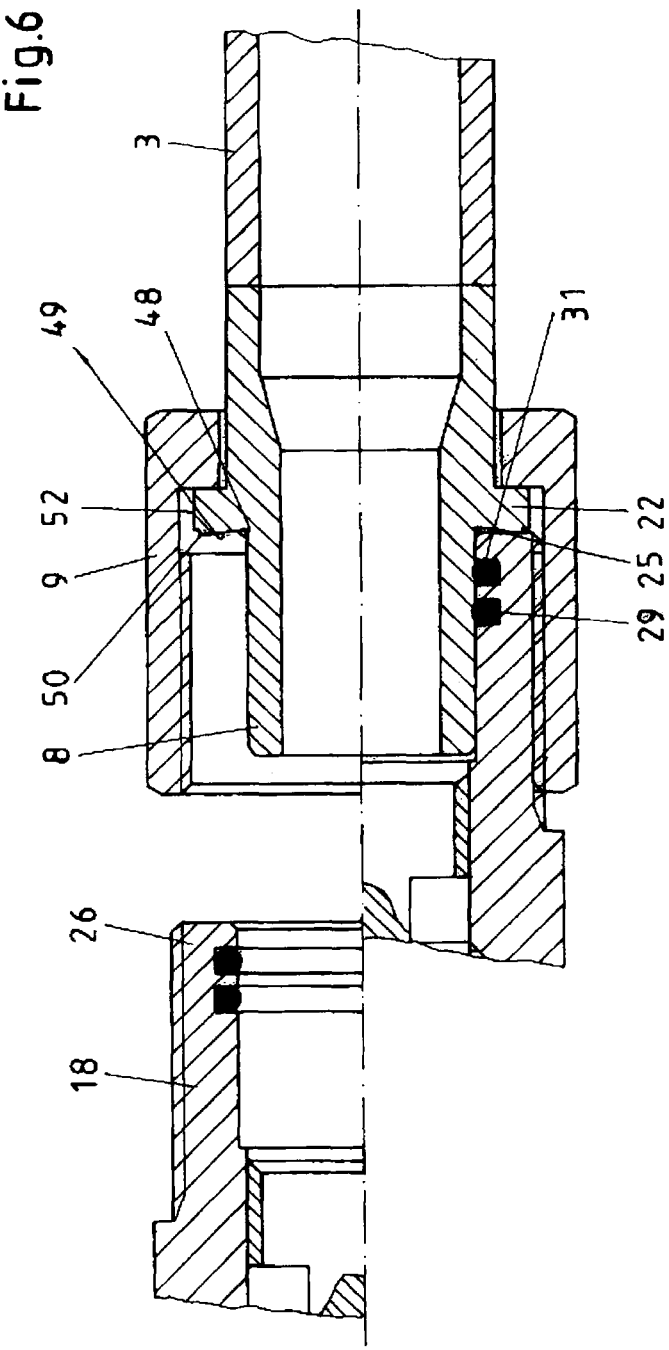

MULTIPLE SECURED COUPLING DEVICE FOR OXYGEN LANCES

This application claims the benefit of German Application No. 10 2010 056 153.3 filed Dec. 28, 2010, German Application No. 10 2011 014 323.8 filed Mar. 18, 2011, and PCT/DE2011/002127 filed Dec. 15, 2011, International Publication No. WO 2012/089188, which are hereby incorporated by reference in their entirety as if fully set forth herein.

The invention concerns a multiple secured coupling device for oxygen lances and other pipes that carry highly flammable gases through which these media are injected, for example, into the steel melt, whereby the oxygen lance or the pipe is connected to a flexible lance tube leading to the supplier via a valve, above all in the form of a lance holder and an interposed safety pipe and the coupling device, or directly as well.

BACKGROUND OF THE INVENTION

A combustion pipe holder or an oxygen lance with a lance holder is familiar, for example, from EP 0 372 099 B1. However, only a thread is indicated at the oxygen intake of this lance holder onto which a safety pipe that is not shown here is screwed. Such safety pipes or safety sections, mainly made of stainless steel, are helpful with hand-operated lance holders and serve above all to increase operational safety, because they are intended to achieve the perfect introduction of the flammable gases, above all of the oxygen, through into the lance holder. However, it is difficult if the coupling device between the oxygen lance and the safety section or the safety pipe is handled carelessly and the coupling device is not tightened sufficiently, because it may happen that the highly flammable gas escapes. For this reason it is important that the coupling device is always fastened tightly in order to guarantee the seal tightness of the connection. However, in case of carelessness the described danger is still present.

The invention is therefore based on the problem of creating a coupling device above all for oxygen supply pipes in steel works with which dangerous leaks are approximately avoided, even, where possible, completely ruled out.

BRIEF SUMMARY OF THE INVENTION

The problem is solved in accordance with the invention in that the coupling device consists of a male connector of the safety pipe that can be inserted into the lance holder and a cap nut that can be screwed onto the lance holder, both of which are extended with the connection part of the lance holder by a safety piece with a seal face or a thread and are connected to the lance holder through at least a sealing ring for sealing.

With a coupling device constructed in this way between the oxygen lance and the safety pipe, the necessary safety is guaranteed even if the cap nut is not tightened one hundred per cent. The invention achieves this by extending both the connection part and the cap nut and the male connector as well, first to create an additional sealing zone, and, secondly, to guarantee the necessary seal tightness of the system through the extended male connector and the appropriately mounted sealing ring, even if the cap nut is loose. The sealing ring is positioned so that the male connector can be inserted far into the connection part of the lance holder and the sealing ring is only positioned at the extreme end of the connection part. The sealing ring is therefore still effective as well if the male connector is pulled out of the male connector by a specific section through a loose cap nut. In addition, it is advantageous that an additional seal face is created in the extended section of the male connector, or in the section of the safety piece, that additionally impedes the escape of highly flammable gas or makes it impossible.

In accordance with a practical embodiment of the invention it is provided that the connection part of the lance holder serves as an extended female part and is constructed to have the friction sealing ring available on the appropriately extended male connector of the safety pipe or of the flexible lance hose that serves as the male part. With this particular formation it is advantageously possible to immerse the extended male part so far into the extended female part that, as already mentioned above, even if the cap nut is not fully tightened the necessary seal tightness is given. Apart from this, bending or snapping in this area is ruled out because the two components are inserted far into each other.

In accordance with a second practical embodiment it is provided that the cap nut with an internal thread corresponding to the external thread of the lance holder is assigned to the male part of the safety pipe that serves as male connector. The necessary secure connection between safety pipe and lance holder can be guaranteed, because both threaded areas are the same length and have the same shape.

In supplement to this, the invention provides that the male connector has a support ring against whose internal side, which is formed as a seal face, the free end of the connection part of the lance holder can be pressed through the cap nut that can be slid on the external thread. With the help of this further formation it is possible, by pressing the cap nut correctly, to press the connection part against the male connector in such a way that a further sealing zone is created here. This is an advantage, even if a separate sealing ring is not positioned there, because the faces that are adapted to each other are able to develop a corresponding sealing effect.

It has been pointed out above that the sealing ring is positioned in the connection part of the lance holder, therefore in the extended female part, in such a way that a sealing effect is still present if the male connector is pulled slightly out of the connection part with a loose fitting cap nut. This is ensured by assigning the sealing ring to the free end of the connection part, namely as far as possible at the free end in order to maintain the above-mentioned security of the connection for as long as possible.

It is expedient in accordance with the invention if the sealing ring is formed by two O-rings positioned in spaced annular grooves. These O-rings can be safely installed in the annular grooves and develop their sealing effect in two consecutive sealing zones.

The cap nut, the male connector and the connection part of the lance holder as well are constructed extended by a so-called safety piece. With regard to the male connector and connection part, the male connector should have a free seal face projecting over the O-rings of the sealing ring that is preferably twice the size of the seal face covered by the two O-rings. This results in an indication of measurements that is to be realised depending on the situation without the need for major changes.

The flexible lance tube is connected to the safety pipe at the other end of the safety pipe. Here as well, high security is achieved through the counter connection piece of the safety pipe being formed in accordance with the connection part of the lance holder. The flexible lance tube also thus acquires a male connector that conforms to the male connector of the safety pipe, so that an equally advantageous connection is possible as with the lance holder.

The present invention acquires an additional sealing zone in that a ring land that serves as the same time as stopper for the male connector is formed in the deepest part of the connection part of the lance holder. This means that when the cap nut is impinged on, the sealing zone in the deepest part and in the area of the support ring can be sealed as well, so that, together with the sealing ring there are practically four sealing zones that are beneficial for the advantageous sealing effect of the coupling device.

The cap nut itself is also formed extended, like the male connector and the connection part, whereby in accordance with an advantageous development it is provided that the cap nut is formed to have up to twenty, preferably fifteen, thread pitches, whereas standard cap nuts have only five to seven thread pitches. This makes it clear that additional security is provided through the longer thread as well, because even with a slightly loose cap nut there is still sufficient thread available to prevent separation and thus a complete leak.

A permanent light connection between lance holder and safety pipe through the coupling device is given in particular if the cap nut is made of brass and the male connector and the remaining safety pipe are made of stainless steel. The cap made of the less hard metal can thus be screwed effortlessly onto the connection part of the lance holder, which is also made of stainless steel.

Along with the already mentioned total of four sealing zones, a fifth sealing zone is created in the area between the male connector and the female part of the lance holder in that the male connector of the safety pipe and the female part of the lance holder are designed together to form a safety shaft that has a continuous sealing ring surface. This safety shaft therefore not only has the task of establishing greater stability, but also a continuous seal face that ensures in addition that no highly flammable gases at all can flow through this area.

It was already pointed out above that there is an additional sealing zone between the support ring and the free end of the connection part and namely without a separate sealing ring. In accordance with a practical embodiment, the seal face at the support ring is formed as a metallic seal at the support ring. The invention achieves this above all in that, seen from the surface, the seal face is placed obliquely outwards and in this has an angle of preferably 5°. Finally, a sealing edge is created in this bevel, so that a particularly intensive metallic seal is created that functions as an additional sealing zone.

The invention is characterised in particular as well by a multiple secured coupling device being created between the oxygen lance and the connecting flexible lance tube, which is then a considerable advantage as well if a safety pipe or a safety section is planned between the oxygen lance and the flexible lance tube. This safety pipe has an enlarging safety piece over the whole length on both sides with a seal face or thread, so that when the safety pipe and the connection part of the oxygen lance are fitted into each other, complete sealing of this coupling device is achieved. With a total of five sealing zones the necessary seal tightness is achieved even if the cap nut is not tightened due to carelessness. In particular with the working area referred to here, in which highly flammable gases are injected into the steel melt, this absolute tightness of the connection point is enormously advantageous. In addition, the coupling device satisfies the existing problem of permanently high pressure of the oxygen or other gas in the area of the lance holder.

BRIEF DESCRIPTION OF THE DRAWINGS

Further details and advantages of the invention can be seen in the following description of the relevant drawings, in which a preferred embodiment is shown with a necessary details and individual parts:

FIG. 1 shows a cross-section through a lance holder and the still uncoupled safety pipe, FIG. 2 shows the cross-section in accordance with FIG. 1 with a coupled safety pipe, FIG. 3 an enlarged section of the coupling connection in accordance with FIG. 1 before coupling, FIG. 4 an enlarged section of the coupling connection in accordance with FIG. 2 after coupling, FIG. 5 an enlarged cross-section of the safety pipe with the cap nut pushed back, and FIG. 6 shows a cross-section with the sealing edge resulting in an additional sealing zone.

DETAILED DESCRIPTION OF THE DRAWINGS

Figure 3:
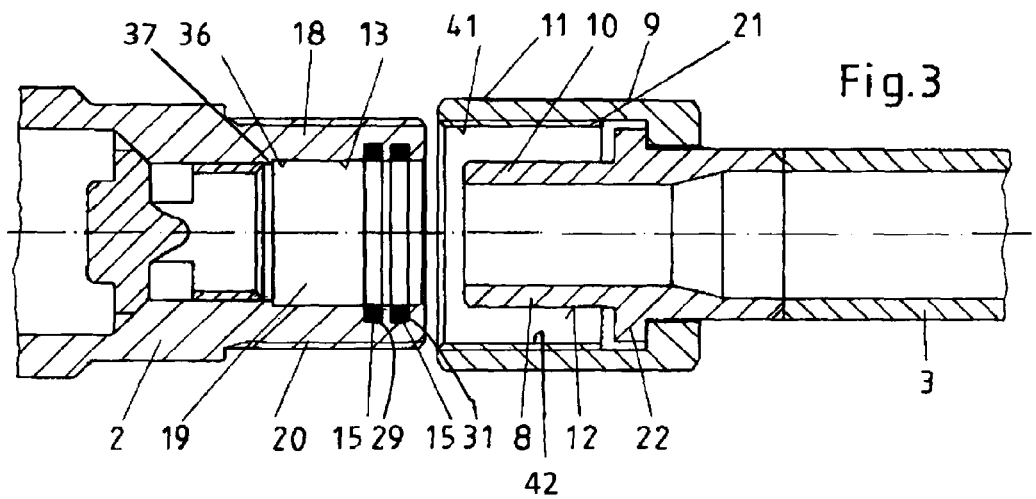

Only a part section of the actual oxygen lance 1 can be seen in FIG. 1. This oxygen lance 1 or the corresponding pipe is inserted into the lance holder 2 and effectively fixed there. On the opposite side of this lance holder 2, a safety pipe 3 is connected to the connection part 18 of lance holder 2. This is done through the coupling device 4, which consists of the male connector 8 of safety pipe 3 and the cap nut 9. The cap nut 9 is screwed onto the connection part 18 of the lance holder 2. The same coupling device 5 is provided for on the opposite side of the safety pipe 3 with which the safety pipe 3 is connected to the flexible lance tube 6.

Both the male connector 8 of the coupling device 4 and the connection part 18, and finally the cap nut 9 as well, have an additional safety piece 10, 11, so that altogether an extended safety shaft 40 is realised. This safety shaft 40 has a ring surface 39, which represents practically a first sealing zone. In FIG. 3, therefore, the external surface of the safety piece 10 or of the male connector 8 is designated as seal face with the reference number 12, just as the internal surface of the connection part 18 of the lance holder 2 is designated with reference number 13. If these seal faces 12, 13 lie on top of each other as shown in 4, the result is an advantageously long sealing zone.

It can be seen in FIGS. 1 and 2 that the counter-coupling part 35 of the safety pipe 3 is formed like the opposite end of the lance holder 2, namely like connection part 18. In the deepest part 36 of this fitting 35 a ring land 37 is formed that serves as a stopper for the male connector 8 of the safety pipe 3 that is introduced or is to be introduced, but at the same time as a sealing zone, because a correspondingly high clamping pressure can be achieved through the cap nut 9. The extended cap nut 9 corresponds with its internal thread 21 to the external thread 20 of the lance holder 2 or its connection part 18, which can be seen in particular in FIG. 3 as well. External thread 20 and internal thread 21 result in the thread 14, through which the cap nut 9 has a total of around fifteen thread pitches 41, 42 on which connection part 18 can be slid in order to realise the individual sealing zones.

In the process, the seal face 25 is activated, namely the one at the free end 26 of the connection part 18, which corresponds here to the support ring 22 or to its internal surface 23, so that the sealing zone referred to can be realised.

FIG. 1 shows the coupling device 4 in the open position and FIG. 2 shows it in the closed position.

Figure 4:
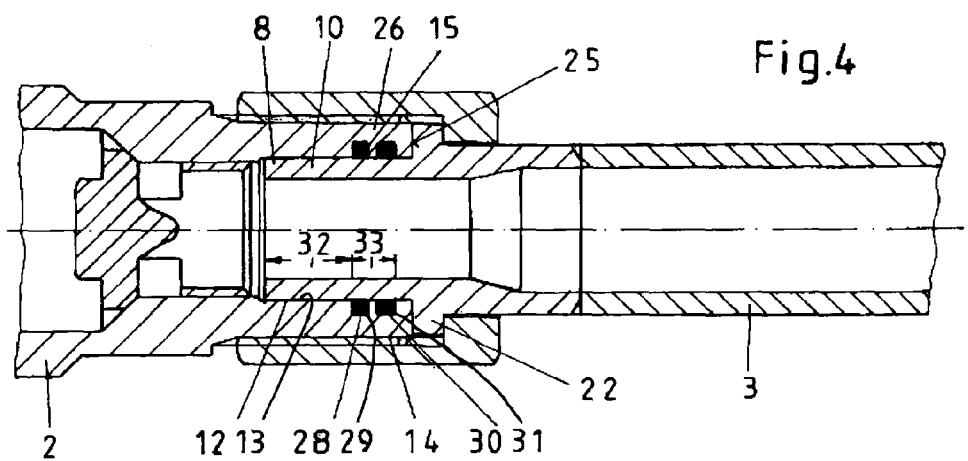

The essential seal is achieved through the sealing ring 15 at the free end 26 of the connection part 18 that is formed as female part 19. In the embodiment shown in FIGS. 1 to 5, this sealing ring 15 is realised through two spaced annular grooves 28, 30 with O-rings 29, 31, whereby these two O-rings 29, 31 each form an optimum sealing zone. In this way, the main sealing effect still exists even if the cap nut 9 was not tightened correctly or has become loose, so that the male connector 8 has been pulled out of the female part 19 by a certain amount. It is advantageous if the seal face 33 covered by the O-rings at the male connector 8 makes up about 33% to 50% of the seal face 32, which is formed only by the female part 19 or male connector 8. This is made clear correspondingly in FIG. 4.

Figure 5:
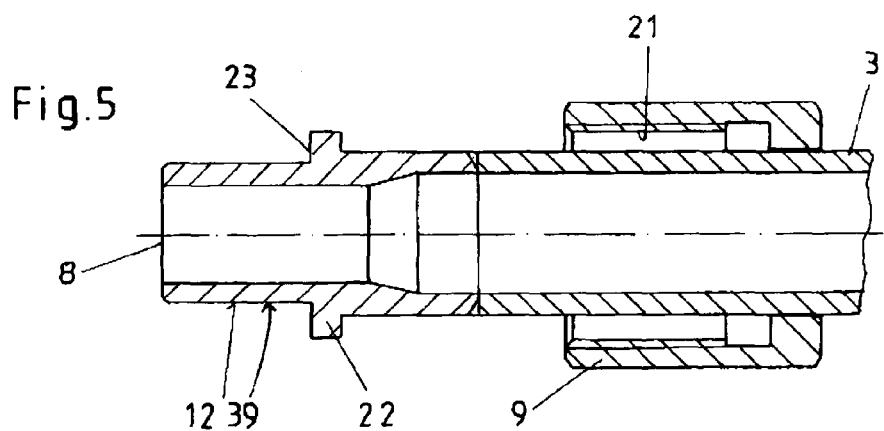

FIG. 5 makes clear that the cap nut 9 can be slid easily. It is shown here pushed very far back in order to show the male connector 8 at the front end of the safety pipe 3. It is formed extended, has a ring surface 39 that functions as seal face 12 and provides the above-mentioned multiple security both with regard to the seal and with regard to stability (security against breaking). All this is of great importance, because even with the closed valve in the lance holder 2, highly flammable gas under high pressure is applied in this section.

Finally, FIG. 6 shows the additional sealing zone in the area of the inside of the support ring 22. In the upper part area with the male valve 8 withdrawn from the cap nut 9 it can be seen that the inside of the support ring 22 forms a bevel 49, namely a bevel 49 that leads up from the surface base 48 to the outer edge 52 of the support ring 22. This bevel 49, which forms seal face 25, breaks off shortly before the outer edge 52, so that a sealing edge 50 is created. Because the bevel 49 as at an angle of ~5° to the vertical, the sealing edge 50 advantageously supports the metallic seal.

In summary it is pointed out that four or a total of five sealing zones as well are realised in the coupling device in accordance with the invention that ensure that the necessary sealing is provided with an optimum coupling device, but also with a loosened coupling device that prevents the escape of the highly flammable gases, in particular of oxygen. A sealing zone is realised there where the male connector 8 touches the ring land 37. The second sealing zone and the third sealing zone lie in the area of the O-rings 29 and 31. The fourth sealing zone is realised by pressing the support ring 22 to the front edge of the connection part 18 of female part 19, while the fifth sealing zone is formed by the two seal faces 12, 13 or ring surface 39. This means that an optimum secure connection of lance holder 2 and safety pipe 3, or where applicable of flexible lance tube 6 as well, is always given.

All the above-mentioned characteristics, including those that can only be seen in the drawings, are regarded alone and in combination as essential to the invention.

The invention claimed is:

1. A device for coupling a lance carrying highly flammable gases and a flexible tube comprising:
   an elongated safety pipe connectable the lance and the flexible tube,
      the safety pipe having a first safety pipe end and a second safety pipe end,
      a coupling device at each of the first safety pipe end and the second safety pipe end,
      the coupling device comprising a female connector or a male connector including a cap nut on the male connector,
      the female connector comprising a female connector elongated connection portion having a first female connector section with a first female connector end and a second female connector section with a second female connector free end, a female connector inner side and a female connector outer side of the female connector elongated connection portion, an outer threaded portion on the female connector outer side along the second female connector section,
      the male connector comprising a male connector elongated connection portion complementary to the female connector elongated connection portion and having a first male connector section with a first male connector end and a second male connector section with a second male connector free end, a male connector inner side and a male connector outer side of the male connector elongated connection portion,
      the cap nut having a first cap nut end and a second cap nut free end and a cap nut inner side and a cap nut outer side, an inner threaded portion along the cap nut inner side between the first and the second cap nut ends complementary to the outer threaded portions on the female connector,
      the inner and the outer threaded portions being parallel to each other when the male connector and the female connector are coupled to the lance and the flexible tube respectively,
      a seal tightness formed by the male connector elongated connection portion when the male connector is connectable coupled within the lance,
      the cap nut threadable on a threaded portion of the lance,
      wherein the cap nut encloses the threaded portion of the lance,
      a first seal zone without any space between the male connector outer side and an inside of the lance.

2. The device of claim 1, wherein the coupling device at each of the first safety pipe end and the second safety pipe end is a counter connector having the male connector integrated at one of the first safety pipe end or the second safety pipe end and the female connector at another of the first safety pipe end or the second safety pipe end.

3. The device of claim 2, wherein the cap nut is of brass material.

4. The device of claim 3, wherein the male connector and the safety pipe are of stainless steel material.

5. The device of claim 1, further comprising at least one sealing ring in the second female connector free end of the second female connector section, and a third seal zone along the first male connector end of the first male connector section formed by the at least one sealing ring.

6. The device of claim 5, wherein the at least one sealing ring is a friction sealing ring, and the first seal zone comprises the friction sealing ring in the female connector.

7. The device of claim 5, wherein the second female connector free end comprises spaced annular grooves and wherein the at least one sealing ring comprises two O-rings disposed in the spaced annular grooves.

8. The device of claim 5, further comprising an annular support ring on the first male connector end, the annular support ring having first and second faces.

9. The device of claim 8, wherein the first face of the annular support ring is a metallic seal.

10. The device of claim 8, wherein the annular support ring has an inner edge on a base of the annular support ring disposed on the first male connector end and an outer edge distal from the inner edge and the first face has a bevel extending radially outwards from the inner edge to the outer edge of the annular support ring.

11. The device of claim 10, wherein the bevel has an inclination of 5° to the vertical.

12. The device of claim 10, wherein the bevel is a first bevel and further comprising a sealing edge on the outer edge of the annular support ring having a second bevel between the first bevel and an outer rim of the annular support ring.

13. The device of claim 1, wherein the cap nut comprises ten to twenty thread pitches.

14. A safety pipe connector for oxygen lances (1) and other pipes carrying easily flammable gases-leading pipes through which the easily flammable gases are injected in a steel melt, comprising a lance holder (2) and a safety pipe (3) being disposed between the lance holder (2) and a lance hose (6), a coupling device (4, 5) on each of two ends of the safety pipe, the lance holder (2) comprising a connection part (18) coupled to the coupling device (4), one of the two ends of the safety pipe (3) comprising a male connector (8) insertable in the connection part (18) of the lance holder (2) and a cap nut (9) threadably connected on the connection part (18) of the lance holder (2), the connection part (18) comprising an outer threaded portion and the cap nut (9) comprising a complementary inner threaded portion, the inner and the outer threaded portions being parallel to each other when the connection part (18) and the male connector (8) are coupled, an elongated safety piece (10, 11) formed on the lance holder (2) by the connection part (18), the male connector (8) and the cap nut (9), at least one free end (26) of the connection part (18) comprising at least one annular seal (15) having a support ring (29) within the at least one annular seal, and a sealing surface (12) formed by the annular seal on the male connector (8).

15. The safety pipe connector of claim 14, further comprising a supply pipe connecting a supplier to the lance hose via a valve, wherein the lance holder has a first lance holder end and a second lance holder end, one of the first lance holder end or the second lance holder end being connected to the lance pipe and another of the first lance holder end or the second lance holder end connected to the safety pipe, wherein the first lance holder end or the second lance holder end connected to the safety pipe has the female connector or the male connector integrated counter to a first safety pipe end or a second safety pipe end having the male connector or the female connector of the coupling device, respectively.

16. The device of claim 14, wherein the male connector and the connection portion together form a safety shaft having a continuously sealed ring surface.

17. The safety pipe connector of claim 14, further comprising a counter connection piece (35) at another of the two ends of the safety pipe (3) comprising the connection part (18) for coupling to the male connector of the lance hose (6).

18. The safety pipe connector of claim 14, wherein a male connector section is parallel to the outer threaded portion of the connection part and the inner threaded portions of the cap nut when coupled.

19. The safety pipe connector of claim 14, further comprising a first seal zone without any space between an outer side of the male connector and an inner side of the female connector.

20. The safety pipe connector of claim 19, further comprising a second seal zone between the female connector outer side and the cap nut inner side.

21. The safety pipe connector of claim 20, further comprising at least one sealing ring in a free end of the connection part (18), and a third seal zone along a first male connector end of a first male connector section formed by the at least one sealing ring, wherein the at least one sealing ring is a friction sealing ring, and the first seal zone comprises the friction sealing ring in the connection part, wherein a free end of the connection part (18) comprises spaced annular grooves and wherein the at least one sealing ring comprises two O-rings disposed in the spaced annular grooves, and wherein a length of a second male connector section is greater than a length of the first male connector section covered by the two O-rings in the female connector.

22. The, safety pipe connector of claim 20, wherein the second seal zone comprises threadable connections between the connection part and the cap nut.

23. The safety pipe connector of claim 22, wherein the threadable connections comprise internal threads on the inner threaded portion of the cap nut and complementary external threads on the outer threaded portion of the connection portion for coupling the female connector between the cap nut and the male connector.

24. The safety pipe connector of claim 20, further comprising an annular support ring on a first male connector end, the annular support ring having first and second faces, further comprising a fourth seal zone between a connection part free end abutting the first face of the annular support ring and between the second face of the annular support ring and a first cap nut end.

25. The device of claim 24, further comprising a ring land along an inner edge of the first female connector end, a stopper along the second male connector free end formed by the ring land.

26. The safety pipe connector of claim 24, further comprising a ring land along an inner edge of the connection part free end, a stopper along the male connector free end formed by the ring land, and a fifth seal zone between the second male connector free end and the inner edge of the first female connector end.

* * * * *